United States Patent
Janzen (10) Patent No.: US 8,769,637 B2
(45) Date of Patent: Jul. 1, 2014

(54) ITERATED PASSWORD HASH SYSTEMS AND METHODS FOR PRESERVING PASSWORD ENTROPY

(75) Inventor: Wolfzang S. Janzen, Mannheim (DE)

(73) Assignee: SAP AG, Walldorf (DE)

( * ) Notice: Subject to any disclaimer, the term of this patent is extended or adjusted under 35 U.S.C. 154(b) by 960 days.

(21) Appl. No.: 11/723,997

(22) Filed: Mar. 23, 2007

(65) Prior Publication Data

US 2008/0235772 A1 Sep. 25, 2008

(51) Int. Cl.
*H04L 29/06* (2006.01)

(52) U.S. Cl.
USPC ............. 726/5; 726/2; 713/150; 713/168; 713/176; 380/255

(58) Field of Classification Search
USPC .......................................................... 726/5
See application file for complete search history.

(56) References Cited

U.S. PATENT DOCUMENTS

| | | | | |
|---|---|---|---|---|
| 6,064,736 | A * | 5/2000 | Davis et al. | 713/155 |
| 6,178,508 | B1 * | 1/2001 | Kaufman | 713/183 |
| 6,539,479 | B1 * | 3/2003 | Wu | 713/151 |
| 2004/0083373 | A1 * | 4/2004 | Perkins et al. | 713/189 |
| 2004/0172535 | A1 * | 9/2004 | Jakobsson et al. | 713/168 |
| 2006/0041759 | A1 * | 2/2006 | Kaliski et al. | 713/184 |
| 2006/0136713 | A1 * | 6/2006 | Zimmer et al. | 713/150 |
| 2006/0173762 | A1 * | 8/2006 | Clater | 705/35 |
| 2006/0184788 | A1 * | 8/2006 | Sandhu et al. | 713/159 |
| 2006/0248333 | A1 * | 11/2006 | Sandhu et al. | 713/155 |
| 2007/0039042 | A1 * | 2/2007 | Apelbaum | 726/6 |
| 2007/0061571 | A1 * | 3/2007 | Hammes et al. | 713/168 |
| 2007/0118732 | A1 * | 5/2007 | Whitmore | 713/155 |
| 2007/0169181 | A1 * | 7/2007 | Roskind | 726/5 |
| 2007/0258594 | A1 * | 11/2007 | Sandhu et al. | 380/277 |
| 2007/0271398 | A1 * | 11/2007 | Manchester et al. | 709/249 |

OTHER PUBLICATIONS

RSA Laboratories, PKCS#5 v2.0: Password-Based Cryptography Standard, PKCS Editor (1999), 1-30.
Andres Andreu, Salted Hashes Demystified—A Primer (2005), 1-14, downloaded from http://www.securitydocs.com/link.php?action=detail&id=3439&headerfooter=no.

* cited by examiner

*Primary Examiner* — Andrew Goldberg
*Assistant Examiner* — Gary Gracia
(74) *Attorney, Agent, or Firm* — Finnegan, Henderson, Farabow, Garrett & Dunner LLP (57) ABSTRACT

Methods and systems consistent with the invention provide a hash process for use in password authentication. For instance, in one embodiment, a method may include receiving password data and combining the password data with a salt value. The salt value may, for example, be a random number. The method may also include calculating a first hash value based on the combined password data and salt value. The method may further include calculating, in a second iteration, a second hash value based on the first hash value and the password. In exemplary implementations, the method may also iteratively calculate a new hash value by applying the output hash value of a previous iteration, in combination with the password data, to the hash function. The number of iterations may be determined by an iteration count.

15 Claims, 5 Drawing Sheets

ITERATED PASSWORD HASH SYSTEMS AND METHODS FOR PRESERVING PASSWORD ENTROPY

TECHNICAL FIELD

This disclosure relates generally to password authentication and, more particularly, to password authenticated systems and methods using iterated hashes.

BACKGROUND

Modern computer systems or microprocessor based electronic devices are often interconnected by large scale communication networks. Interconnected systems, such as these, may though be vulnerable to attacks from hackers or other malicious systems. To defend or prevent such attacks, a variety of network security techniques, such as cryptographic tools, have been developed. Cryptographic tools may encrypt and decrypt messages exchanged between different computer systems or keep certain user information secret.

Cryptographic tools may also encrypt secret passwords used by users to login to a computer system. In such an application, the password may be encrypted by the use of a hash function. A hash function can be viewed as a one-way mathematical function that encrypts data. The one-way indicates that, for practical purposes, the one-way hash cannot be calculated backwards; meaning that the hash value cannot be decrypted to reveal the password in clear text again.

The hash function may thus receive the plaintext password as an input and calculates a unique hash value for that password as an output. The computer system may store only a copy of the password's hash value, such that the password's plaintext is known only to the user. In such an arrangement, when the user enters the plaintext password, the system will calculate a hash value for the entered password and compare the hash value to the stored hash value. If the two hash values match, the computer system will then accept the password and authenticate the user. Of course, to make a proper comparison, the same hash function may be applied to the entered password as was used to calculate the stored hash value.

To increase the security of the password hash function, a salt value may be used. As known in the art, the salt value is an extra variable that may be added to the password entered by the user. The salt value may, for example, be a random bit string, such as a string of characters, integers or bits generated by a random number generator. The hash function will thus compute a hash value based on an input comprising the plaintext password and the salt value. Invoking a random-salted password hash function with an identical plaintext password as the input typically results in different hash values as the output. Thus, the salt value increases the difficulty of an attacker calculating backwards the user's plaintext password from the hash value. A random salt value may thus be a counter-measure against attacks based on pre-calculated password hash values (so-called "rainbow table" attacks).

Some password authentication systems may also apply an iterative hash function. In such arrangements, the hash value itself is used as an input to the hash function in a next iteration. Thus, the hash function calculates a new hash value based on the hash value obtained in the previous iteration. Iterated hash calculation may increase the time required to calculate the final hash value and thus may be a counter-measure against certain attacks, such as brute-force or dictionary attacks.

However, the use of a salt value and iterative processing may result in a loss of the plaintext password information (e.g., entropy) in the final hash value. As such, there is a need to improve the password authentication procedures.

SUMMARY

The present invention provides methods and apparatus, including computer program products, for authenticating passwords.

In one exemplary embodiment, there is provided a hash method for use in password authentication. For instance, in one embodiment, the method may include receiving password data and combining the password data with a salt value. The salt value may, for example, be a random number. The method may also include calculating a first hash value based on the combined password data and salt value. The method may further include calculating, in a second iteration, a second hash value based on the first hash value and the password. In exemplary implementations, the method may also iteratively calculating a new hash value by applying the output hash value of a previous iteration, in combination with the password data, to the hash function. The number of iterations may be determined by an iteration count.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
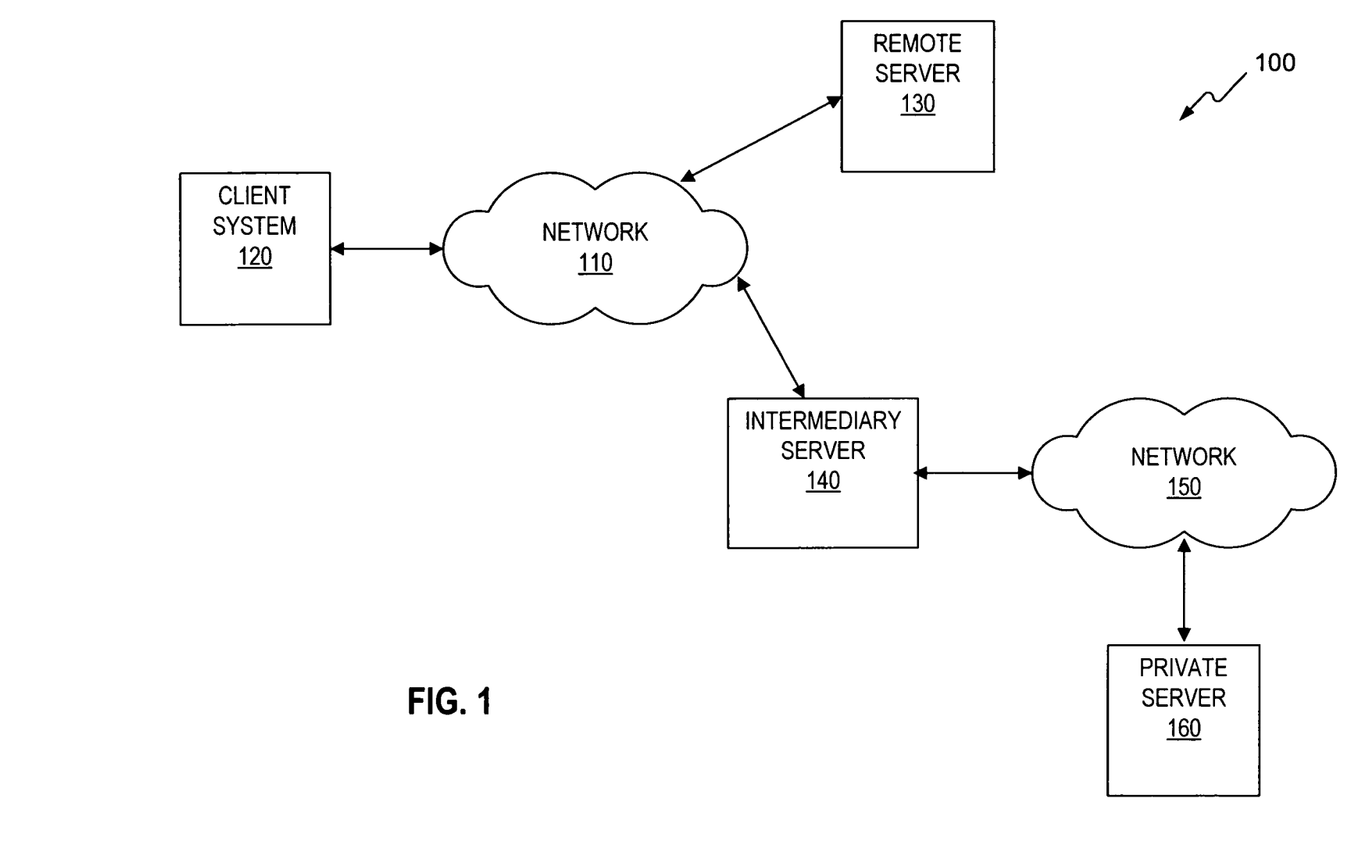
FIG. 1 is a pictorial illustration of an exemplary password authentication environment consistent with the present invention.

FIG. 1 illustrates an exemplary system 100 for illustrating authentication procedures consistent with the present invention. As shown in FIG. 1, system 100 may include a network 110 coupled to a client system 120, a remote server 130, and an intermediary server 140. Client system 120 may thus communicate with servers 130 and 140 via network 110. Network 110 may be any appropriate type of data communication network, such as the Internet. The Internet may refer to any publicly accessible network or networks interconnected via communication protocols, such as transmission control protocol/internet protocol (TCP/IP). System 100 may also include, as shown, a private network 150 coupled to intermediary server 140 and a private server 160. Intermediary server 140 may thus communicate with private server 160 via private network 150. Private network 150 may be any appropriate type of data communication network, such as a local area network or other private computer network. In exemplary embodiments, access to private network 150 may be limited by a firewall (not shown).

Client system 120 may, however, communicate with private network 150 and private server 160 via intermediary server 140. To do so, intermediary server 140 must first authenticate the user of client system 120 before permitting access to private network 150 and private server 160. For instance, the user of client system 120 may be required to provide a password to intermediary server 140. If intermediary server 140 determines that the provided password corresponds to a stored version of the password, then intermediary server 140 authenticates the user and grants client system 120 access to private server 160 via private network 140. Other components of system 100 may perform similar password authentication procedures. For instance, client system 120 may perform similar password authentication procedures with remote server 130.

System 100 may also include safeguards to keep each user's password secret. For instance, as known in the art, system 100 may store only a hash value of a user's password and not store any record of the plaintext version of the user's password. The hash value represents an encrypted version of the password from which the plaintext version of the password cannot be easily determined. Thus, when a user enters a plaintext password during an authentication procedure, system 100 may apply a predefined hash function to the entered password to calculate a hash value h' for comparison to the stored hash value h. If h' and h match, then the password may be authenticated.

Persons skilled in the art will readily appreciate that system 100 of FIG. 1 is purely exemplary. Password authentication procedures and systems consistent with the invention may be applied to any type of computer system. Thus, the number of any or all of the illustrated parts of system 100 may be changed, some devices may be removed, and other devices may be added without departing from the principle of the present invention.

Figure 2:
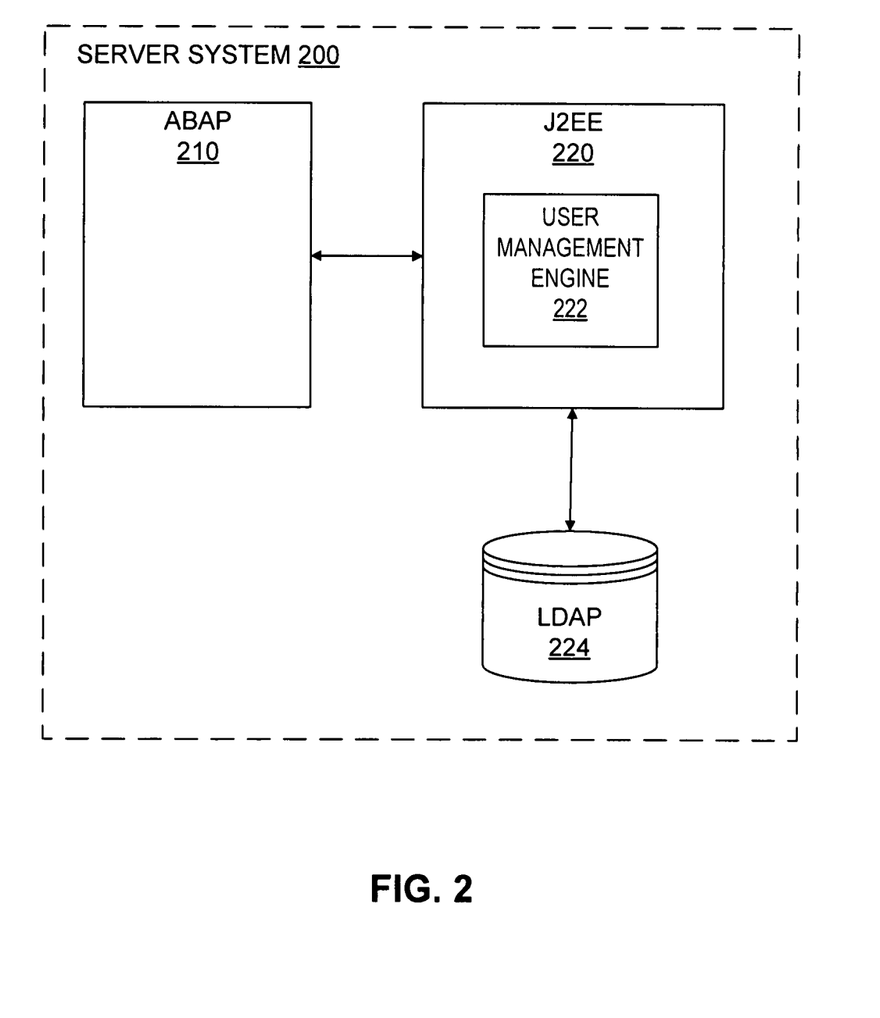
FIG. 2 illustrates a block diagram of an exemplary server, consistent with an exemplary embodiment of the present invention, used to perform password authentication.

FIG. 2 illustrates an exemplary server 200 for performing password authentication systems consistent with the invention. The password authentication procedures and hash functions of server 200, described in greater detail below with respect to FIGS. 3-5, may be used, for example, in any server of system 100 that performs password authentication. For instance, in one embodiment, server 200 may be used to implement intermediary server system 140 of FIG. 1.

As shown in FIG. 2, server 200 may include an ABAP platform 210 and a J2EE platform 220. As known in the art, ABAP platform 210 may be implemented using ABAP, which is an object-oriented programming language designed by SAP AG, Walldorf, Germany. ABAP platform 210 may, for instance, provide advanced business application functionality from databases (not shown) to clients of server 200. As also known in the art, J2EE platform 220 may be based on the J2EE programming platform and support Web services and provide development tools to clients of server 200. The ABAP/J2EE implementation of server 200 is, however, exemplary. Embodiments consistent with the invention may be implemented without using ABAP platform 210 and/or J2EE platform 220.

In the exemplary embodiment of FIG. 2, J2EE platform 220 may also include a user management engine (UME) 222 which may use services provided by a Lightweight Directory Access Protocol (LDAP) server 224. UME 222 may thus provide user authentication services at the request of, for example, client system 120 during a logon procedure to J2EE platform 220. To provide user authentication services, UME 222 may receive user information and access LDAP server 224 to verify that a user of a client is authorized to access server 200. As described in greater detail below, determination that a user does have authorized access may entail verifying that server 200 stores a matching hash value h of the user's password. For instance, the matching hash value h may be stored in or by LDAP server 224 stored in a database associated with ABAP platform 210, or in any other part of system 100 or server 200. In this regard, UME 222 may include a processor (not shown) for applying one or more hash functions used by server 200 during a password authentication procedure.

UME 222 may also manage security functions associated with user logon procedures of J2EE platform 220. These security functions may, for example, control the length and content of user passwords and user IDs, or the number of failed logon attempts after which a user is locked out based on predefined security protocols. UME 222 may thus check for compliance with these protocols when users logon to J2EE platform 220, when users register themselves with system 100, when users or administrators change user passwords, or when administrators create new users. If the security protocols are not adhered to, UME 222 may provide detailed error messages.

LDAP server 224 may serve as a central location for storing user data, such as password hash values. When, for example, another server of system 100 needs to perform a password authentication procedure, that server may request data from LDAP server 224. LDAP server 224 may then use the stored password hash information to perform a user authentication procedure before granting access to any requested data. LDAP server 224 may, however, be implemented by any type of server, directory, or computer storage device, and, thus, need not be implemented using LDAP.

In exemplary embodiments, LDAP server 224 may store password hash information associated with each user password. In particular, LDAP server 224 may store, for each user password, password hash information identifying: (1) the password's hash value, (2) the hash function used to calculate the hash value, (3) a salt value used by the hash function, and (4) an iteration count used by the hash function. LDAP server 224 may though store other types of password hash information, as well as storing less than the above listed information.

For instance, LDAP server 224 may also store a "code version" associated with each password. The code version may, for example, indicate system settings defining a particular password encryption scheme used by server 200. In one implementation, the code version may thus identify the structure or format of the stored password hash information so that server 200 may properly parse that information during a password procedure. As an example, the above password hash information (e.g., the hash value, hash function, salt value, and iteration count) may be stored in one character and/or integer string in LDAP server 224. Server 200 may thus use the code version to parse this string to properly identify which values in the string correspond to the hash value, hash function, salt value, and iteration count.

Accordingly, by parsing the password hash information based on the code version, server 200 may thus determine the appropriate hash function to apply in calculating the hash value h' based on an entered plaintext password for comparison with the hash value h stored in LDAP server 224. Server 200 may thus determine it should apply a conventional hash algorithm to confirm a password entered by a user or that it should apply a hash algorithm consistent with the present invention and as described below with respect to FIGS. 3-5. In this way, the code version may apply universal compatibility for password authentication procedures. In another implementation, however, LDAP server 224 may also store password hash information for multiple code versions. In such implementations, LDAP server 224 may store password hash information for all code versions supported by system 100 so that LDAP server 224 may be compatible with various components of system 100 that may apply different password authentication procedures.

Figure 3:
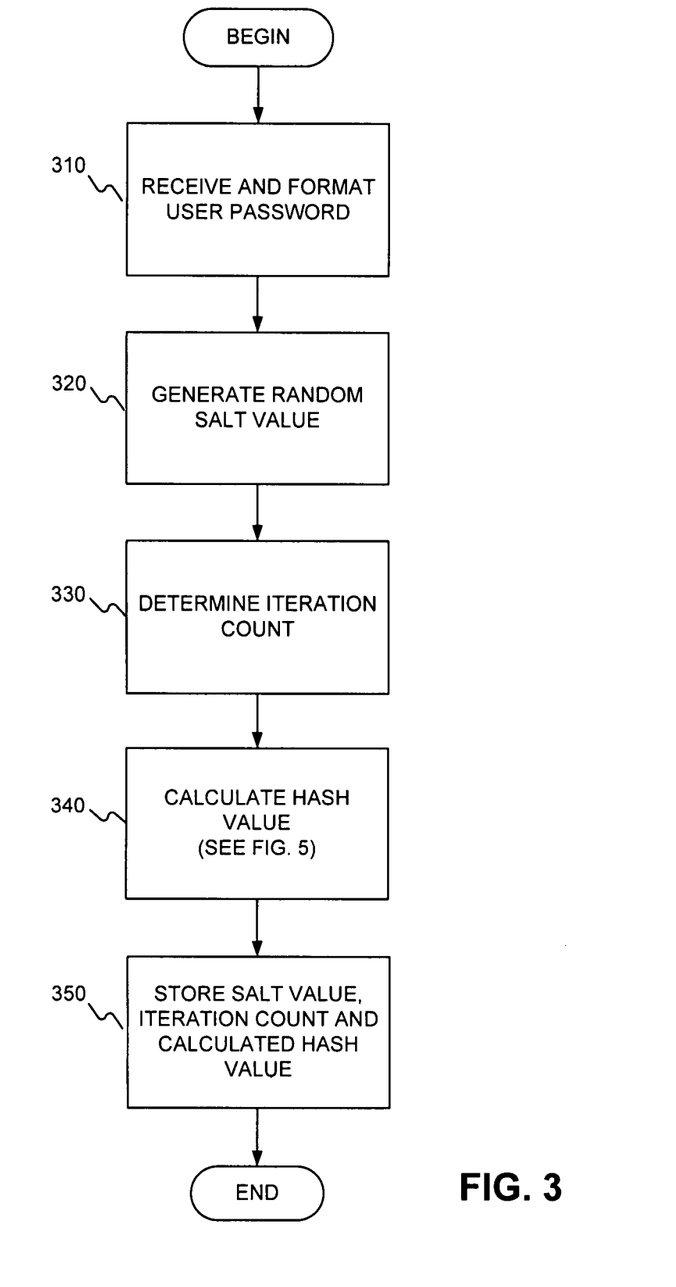
FIG. 3 illustrates an exemplary password hash process for use in password assignment process consistent with the present invention.

FIG. 3 illustrates an exemplary password hash process for use in password assignment process consistent with the present invention. In such an assignment process, as shown in FIG. 3, server 200 may receive a new password from a user and may then format that user password (stage 310). For instance, the plaintext version of the user password may be encoded by applying the UTF-8 encoding scheme known in the art, which converts the plaintext password into a format appropriate for the hash function. Systems consistent with the invention may use other data formatting or encoding schemes, however.

Server 200 may then generate a random salt value (stage 320). As described in more detail below, hash functions consistent with the present invention may use a random salt value in calculating the hash value of the formatted plaintext password. Exemplary embodiments may, for example, apply a 64-bit random salt, although other sizes, such as 128-bits, may be used. To obtain the random salt value for a new password for storage in LDAP server 224, server 200 may include a random number generator (not shown) as known in the art or may store in memory one or more salt values for use by server 200. Persons skilled in the art will appreciate, however, that a variety of ways of obtaining the random salt value may be used in systems consistent with the invention. Further, while exemplary embodiments use a random salt value, alternative embodiments may use a predefined (non-random) salt value or a salt value computed from, for example, information about the user.

Server 200 may then determine an iteration count (stage 330). As also described in more detail below, the iteration count may be used for hash functions consistent with the present invention that calculate the hash value in an iterative manner. In particular, the hash function may proceed through a predetermined number of iterations in determining the hash value. Exemplary embodiments may apply 1024 iterations, although a lesser or greater number of iterations may be used. The determined iteration count may thus define the number of iterations used by the hash function.

Figure 5:
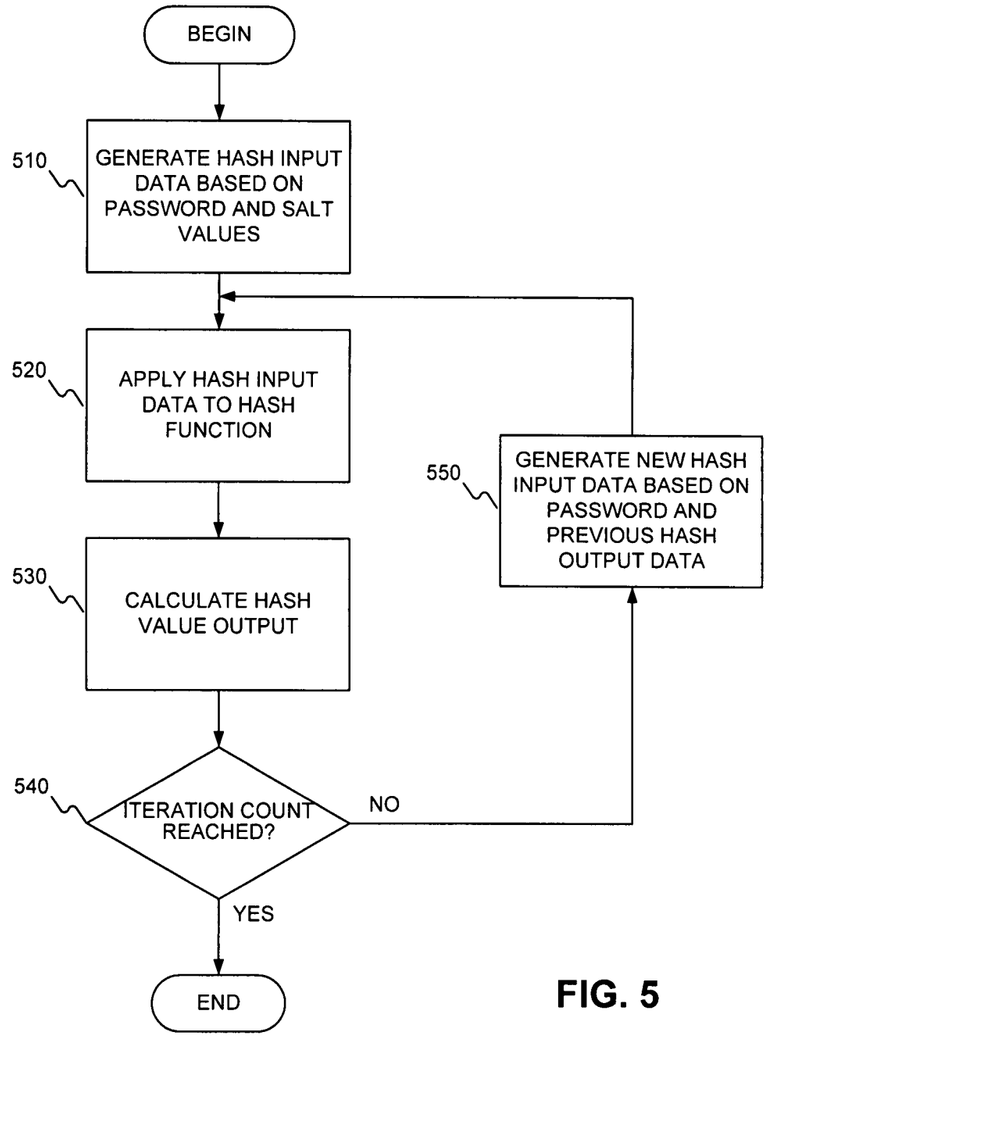
FIG. 5 illustrates an exemplary hash function consistent with the present invention.

Server 200 may then calculate the hash value (stage 340). In particular, server 200 may apply the formatted plaintext password, the generated salt value, and the determined iteration count to a hash function to calculate the hash value h. The exemplary process of FIG. 5 illustrates the processing of stage 340 in more detail.

Server 200 may then store the salt value, iteration count, and calculated hash value h (stage 350). For instance, server 200 may store this password information in LDAP server 224 or other part of server 200 or system 100. For example, LDAP server 224 may store a data string comprised of the password hash value h from stage 340, an identification of the hash function used in stage 340, the iteration count determined in stage 330, and the salt value generated in stage 320. As described above, LDAP server 224 may also store a code version used by system 200 to parse the data string or to determine system settings.

Figure 4:
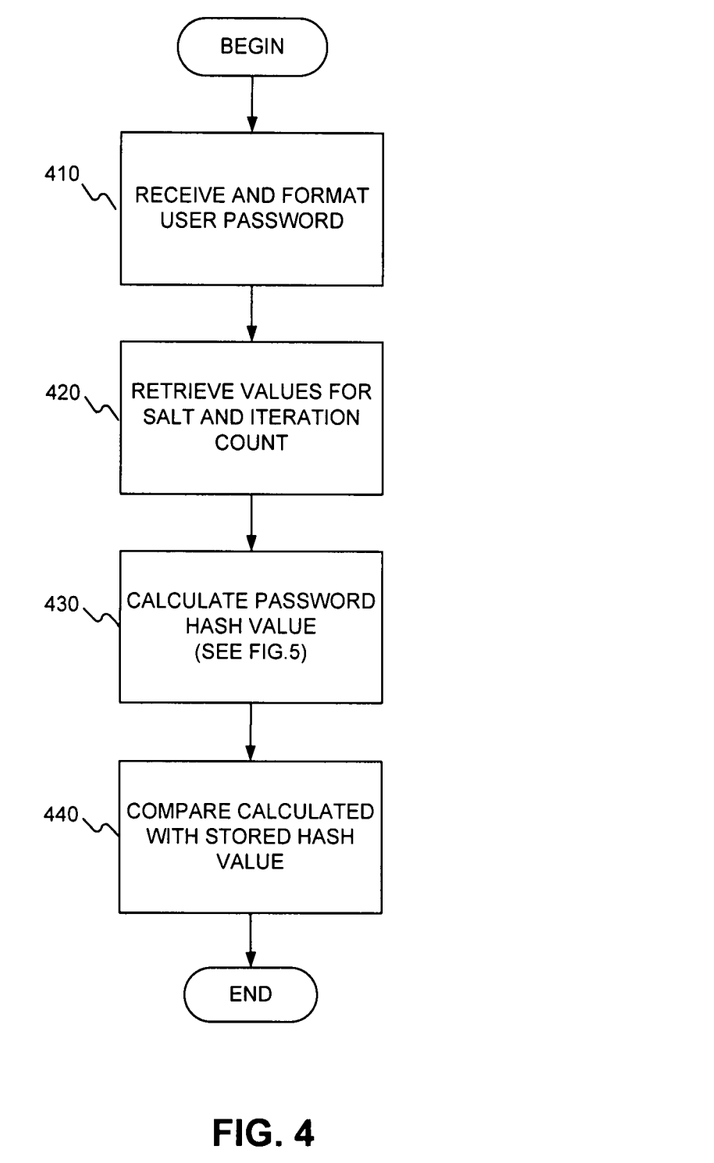
FIG. 4 illustrates an exemplary password hash process for use in password validation process consistent with the present invention.

Accordingly, when the user subsequently logs on to server 200, it may perform a password validation procedure based on the stored password hash information, including hash value h of the user's password. In this regard, FIG. 4 illustrates an exemplary process for validating a user password consistent with the present invention. The exemplary process of FIG. 4 may thus be implemented during a logon procedure. As shown in FIG. 4, when a user subsequently enters a password during a logon procedure with server 200, server 200 may receive the plaintext password and may then format that user password (stage 410). For instance, the plaintext version of the user password may be encoded by applying the UTF-8 encoding scheme known in the art, which converts the plaintext password into a format appropriate for the hash function. Systems consistent with the invention may use other data formatting or encoding schemes, however.

Server 200 may then retrieve the salt value and iteration count stored, for example, during the password assignment procedure (stage 420). For example, as noted above, LDAP server 224 may store the salt value and iteration count in a data string associated with the user. As part of a password validation procedure, server 200 may thus parse this data string to identify and retrieve the salt value and iteration count. As describe above, a code version may be used to identify the structure or format of the data string so that server 200 may properly parse the data string to retrieve the salt value and iteration count.

Server 200 may then calculate a new hash value h' (stage 430). In particular, server 200 may apply the formatted plaintext password received during the logon procedure, as well as the salt value and iteration count stored by server 200, to a hash function to calculate a new hash value h'. The exemplary process of FIG. 5 illustrates the processing of stage 430 in more detail.

Server 200 may then compare the newly calculated hash value h' (e.g., from during the password validation or logon procedure) with the stored hash value h (e.g., from during the password assignment procedure) (stage 440). Server 200 may obtain the stored hash value h from, for example, the data string associated with the user stored in LDAP server 224. If h' and h match, then server 200 may authenticate or validate the password and the user. If, on the other hand, h' and h do not match, then the entered password was not correct and the authentication or validation fails.

FIG. 5 relates to an exemplary hash function consistent with the present invention. As described further below, iterative hash functions consistent with the invention may maintain the password data throughout the hash function's iteration process. By doing so, the hash function may preserve the password entropy. That is, hash functions consistent with the invention may minimize the loss of the password data entropy in calculating the final hash value stored in, for example, LDAP server 224. In at least one exemplary embodiment, a hash function consistent with the invention may be expressed as follows:

$$HV_1 = HF(P+S)$$

$$HV_n = HF(HV_{n-1}+P)$$

where:
P represents the password data;
S represents the salt value;
n represents the iteration count;
HF represents the hash function; and
HV represents the hash value.

Returning to FIG. 5, it illustrates in greater detail a procedure for calculating a hash value consistent with the invention. As noted above, the exemplary procedure of FIG. 5 may be used to implement processing stage 340 of FIG. 3 and processing stage 430 of FIG. 4. The procedure of FIG. 5 may begin by first generating hash input data based on the password and salt value (stage 510). The password may be that received in stage 310 or stage 410 and, as described above, may be initially formatted or encoded into a character and/or integer string for processing by the hash function. The salt value may be that obtained in stage 320 and/or obtained from the user's corresponding password hash information in LDAP server 224. As part of stage 510, the formatted password and salt value may then be combined into one value string for processing by the hash function.

Server 200 may then apply the hash function to the combined password and salt value (stage 520). In systems consistent with the invention, a variety of hash functions may be used. However, exemplary embodiments may use the SHA-1 hash function known to those skilled in the art. Other hash functions, such as the SHA-0, SHA-256, SHA-384, and SHA-512 hash functions, may also be used. Upon applying the hash function, a first hash output value may then be obtained (stage 530).

Server 200 may then determine whether it must perform a next hash iteration based on the iteration count (stage 540). As described above, the iteration count may be determined during password validation (e.g., stage 420) and during password assignment (e.g., stage 330). In any event, exemplary embodiments consistent with the invention may apply multiple iterations. If the number of iterations defined by the iteration count has not yet been reached (stage 540, No), then processing proceeds to stage 550. Here, server 200 may generate new hash input data for the next iteration (stage 550). In particular, server 200 may combine the hash value output in stage 530 with the formatted password. As before, the combined password and hash value may comprise one value string for processing by the hash function.

Processing then reverts back to stage 520, where the new hash input data (the password and the previously calculated hash value) may be applied to the same hash function. A new hash value is then calculated and, if the iteration count has not yet been reached, processing will proceed to the next iteration via stages 550, 520, and 530. In particular, a new hash input data will again be created based on the previous iteration's hash value and the password itself. If, however, the iteration count has been reached (stage 540, Yes), then processing ends. Server 200 may then output the hash value output obtained from stage 530 during the last iteration.

As described above, systems and methods consistent with the invention provide a password authentication procedure employing a hash function that may preserve password entropy. For purposes of explanation only, certain aspects and embodiments are described herein with reference to the components illustrated in FIGS. 1-5. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-5 are exemplary and not intended to be limiting. Thus, other process stages may be used, and even with the processes depicted in FIGS. 1-5, the particular order of events may vary without departing from the scope of the present invention. Moreover, certain process stages may not be present and additional stages may be implemented in FIGS. 1-5. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented hash method for use in password authentication, comprising:
   establishing an iteration count, the iteration count being greater than two;
   identifying a hash function based on a code version associated with password data, the code version establishing an encryption scheme for the password data;
   calculating a first hash value by applying the password data and a salt value to the identified hash function, the salt value being a non-random value computed from information about a user;
   calculating a second hash value by applying the first hash value and the password to the identified hash function, wherein the calculation of the second hash value represents a second iteration;
   iteratively calculating a final hash value based on at least the second hash value and the password data, wherein at corresponding ones of a plurality of iterations, the calculating comprises:
      generating a combination of an output hash value of a previous iteration and the password data; and
      calculating a new hash value by applying the generated combination to the identified hash function, the iteration count being determined by the plurality number of iterations, and the new hash value calculated at a last one of the plurality of iterations being the final hash value; and
   storing the final hash value in a server database, wherein the server database is included in an LDAP server, and the method further comprises:
      storing, in the LDAP server, a password hash entry corresponding to the password data, wherein the password hash entry includes the final hash value, an identifier of the hash function, the salt value, and the iteration count, the password hash entry being stored in a character string or an integer string.

2. The method of claim 1, wherein:
the password data comprises a plaintext password; and
the method further comprises receiving the plaintext password in an encoded format.

3. The method of claim 1, wherein:
the server database includes a plurality of candidate hash functions; and
the method further comprises selecting the hash function from the candidate hash functions based on the identifier associated with the password hash entry.

4. The method of claim 1, further comprising:
obtaining a hash value corresponding to the password data;

determining whether the final hash value corresponds to the obtained hash value; and authenticating a user associated with the password data, when the final hash value corresponds to the obtained hash value.

5. The method of claim 1, wherein storing the final hash value comprises storing, in the server database, information linking the final hash value with a user associated with the password data.

6. The method of claim 1, wherein the final hash value maintains at least a portion of the password data associated with the first hash value.

7. The method of claim 1, wherein identifying the hash function comprises:
   obtaining hash information associated with the password data, the hash information comprising information identifying the salt value, the hash function, and the iteration count; and
   extracting the hash function from the obtained hash information based on the code version, the code version specifying a structure of the obtained hash information.

8. The method of claim 1, further comprising identifying the hash function based on the encryption scheme for the password data.

9. A computer-implemented hash method for use in password authentication, comprising:
   establishing an iteration count, the iteration count being greater than two;
   identifying a hash function based on a code version associated with password data, the code version establishing an encryption scheme for the password data;
   calculating, in a first iteration, a first output hash value by applying password data in combination with a salt value to the identified hash function, the salt value being a non-random value computed from information about a user; and
   iteratively calculating a final hash value based on at least the first output hash value and the password data, wherein at corresponding ones of a plurality of iterations, the calculating comprises:
      generating a combination of a hash value calculated a previous iteration and the password data; and
      calculating a new hash value by applying the generated combination to the identified hash function, the plurality of iterations being determined by the iteration count, and the new hash value calculated at a last one of the plurality of iterations being the final hash value; and
   storing the final hash value in a server database, wherein the server database is included in an LDAP server, the method further including:
      storing, in the LDAP server, a password hash entry corresponding to the password data, wherein the password hash entry includes the final hash value corresponding to the last iteration, an identifier of the hash function, the salt value, and the iteration count, the password hash entry being stored in a character string or an integer string.

10. The method of claim 9, wherein:
   the password data comprises a plaintext password; and
   the method further comprises receiving the plaintext password in an encoded format.

11. A computer system to provide password authentication, comprising:
   a server database configured to receive store password data during a password authentication procedure; and
   a processor in communication with the server database and configured to:
      establish an iteration count, the iteration count being greater than two;
      identify a hash function based on a code version associated with password data, the code version establishing an encryption scheme for the password data;
      calculate a first hash value by applying the password data and a salt value to the identified hash function, the salt value being a non-random value computed from information about a user;
      calculate a second hash value by applying the first hash value and the password to the identified hash function, wherein the second hash value is the output hash value of a second iteration;
      iteratively calculate a final hash value based on at least the second hash value and the password data, wherein at corresponding ones of a plurality of iterations, the processor is further configured to:
         generate a combination of an output hash value of a previous iteration and the password data; and
         calculate a new hash value by applying the generated combination to the identified hash function, the iteration count being determined by the plurality of iterations, and wherein the new hash value calculated at a last one of the plurality of iterations being the final hash value; and
      store the final hash value in the server database, wherein the server database is included in an LDAP server, and wherein the processor is further configured to:
         store, in the LDAP server, a password hash entry corresponding to the password data, wherein the password hash entry includes the final hash value, an identifier of the hash function, the salt value, and the iteration count, the password hash entry being stored in a character string or an integer string.

12. The computer system of claim 11, wherein the server is further configured to receive a plaintext password in an encoded format.

13. The system of claim 11, wherein:
   the server database includes a plurality of candidate hash functions; and
   the processor is further configured to select the hash function from the candidate hash functions based on the identifier associated with the password hash entry.

14. The system of claim 11, wherein the processor is further configured to:
   obtain a hash value corresponding to the password data;
   determine whether the final hash value corresponds to the obtained hash value; and
   authenticate a user associated with the password data, when the final hash value corresponds to the obtained hash value.

15. The system of claim 11, wherein the processor is further configured to store, in the server database, information linking the final hash value with a user associated with the password data.

* * * * *